United States Patent
Bian et al.

(10) Patent No.: US 12,244,409 B2
(45) Date of Patent: Mar. 4, 2025

(54) METHOD AND APPARATUS FOR MODULATION AND CODING SCHEME CONFIGURATION BASED ON HIGHER LAYER PARAMETER

(71) Applicant: ZTE Corporation, Shenzhen (CN)

(72) Inventors: Luanjian Bian, Shenzhen (CN); Bo Dai, Shenzhen (CN); Youjun Hu, Shenzhen (CN); Kun Liu, Shenzhen (CN); Weiwei Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 309 days.

(21) Appl. No.: 17/887,029

(22) Filed: Aug. 12, 2022

(65) Prior Publication Data

US 2023/0216603 A1 Jul. 6, 2023

Related U.S. Application Data

(63) Continuation of application No. PCT/CN2020/136444, filed on Dec. 15, 2020.

(30) Foreign Application Priority Data

Feb. 12, 2020 (CN) .......................... 202010089169.4

(51) Int. Cl.
*H04L 1/00* (2006.01)
*H04L 27/34* (2006.01)

(52) U.S. Cl.
CPC ............ *H04L 1/0003* (2013.01); *H04L 27/34* (2013.01)

(58) Field of Classification Search
CPC ......... H04L 1/0003; H04L 27/34; H04L 1/08; H04L 1/1825; H04L 1/189; H04L 1/0009;
(Continued)

(56) References Cited

U.S. PATENT DOCUMENTS

2014/0192732 A1* 7/2014 Chen ....................... H04L 1/003
 370/328
2019/0215095 A1 7/2019 Park
(Continued)

FOREIGN PATENT DOCUMENTS

| CN | 103944855 A | 7/2014 |
| CN | 111901067 A | 11/2020 |

(Continued)

OTHER PUBLICATIONS

ZTE, "Discussion on UL and DL 16QAM for NB-IoT", *3GPP TSG RAN WG1∩102-e*, R1-2005479, Aug. 8, 2020, section 2 (5 pages).
(Continued)

*Primary Examiner* — Afshawn M Towfighi
(74) *Attorney, Agent, or Firm* — Crowell & Moring LLP

(57) ABSTRACT

Provided are a configuration method and apparatus, a receiving method and apparatus, a device, and a storage medium. The configuration method includes: determining a modulation and coding scheme (MCS) set based on a higher-layer configuration parameter; and configuring an MCS of data based on the MCS set; where the higher-layer configuration parameter indicates whether data transmission supports a 16 quadrature amplitude modulation (16QAM) modulation scheme, and the MCS set includes one or more of: a first MCS set and a second MCS set.

14 Claims, 3 Drawing Sheets

(58) Field of Classification Search
CPC .. H04L 5/0091; H04L 1/0016; H04L 41/0803
See application file for complete search history.

(56) References Cited

U.S. PATENT DOCUMENTS

| | | | |
|---|---|---|---|
| 2020/0213033 A1* | 7/2020 | Chen | H04L 1/0007 |
| 2023/0199768 A1* | 6/2023 | Yan | H04L 1/0023 |
| | | | 370/329 |
| 2024/0313931 A1* | 9/2024 | Lim | H04L 5/0064 |

FOREIGN PATENT DOCUMENTS

| EP | 2 993 969 A1 | 10/2015 |
|---|---|---|
| EP | 3 297 319 | 3/2018 |

OTHER PUBLICATIONS

Mediatek Inc., "Rel-17 16QAM support for NB-IoT", *3GPP TSG RAN WG Meeting ∩86*, RP-192672, Dec. 9, 2019, section 2 (4 pages).

International Search Report and Written Opinion for International Application No. PCT/CN2020/136444 mailed Mar. 12, 2021 including translation of International Search Report (9 pages).

ZTE et al., "Detailed sub-PRB allocation design for MTC", 3GPP TSG RAN WGI Meeting ∩90bis, R1-1717199, Oct. 9, 2017 (6 pages).

MediaTek Inc., 3GPP TSG RAN WG Meeting ∩86, Dec. 9, 2019, RP-192672 (4 pages).

European Search Report for EP Application No. 20919317.6 mailed Feb. 15, 2024 (10 pages).

\* cited by examiner

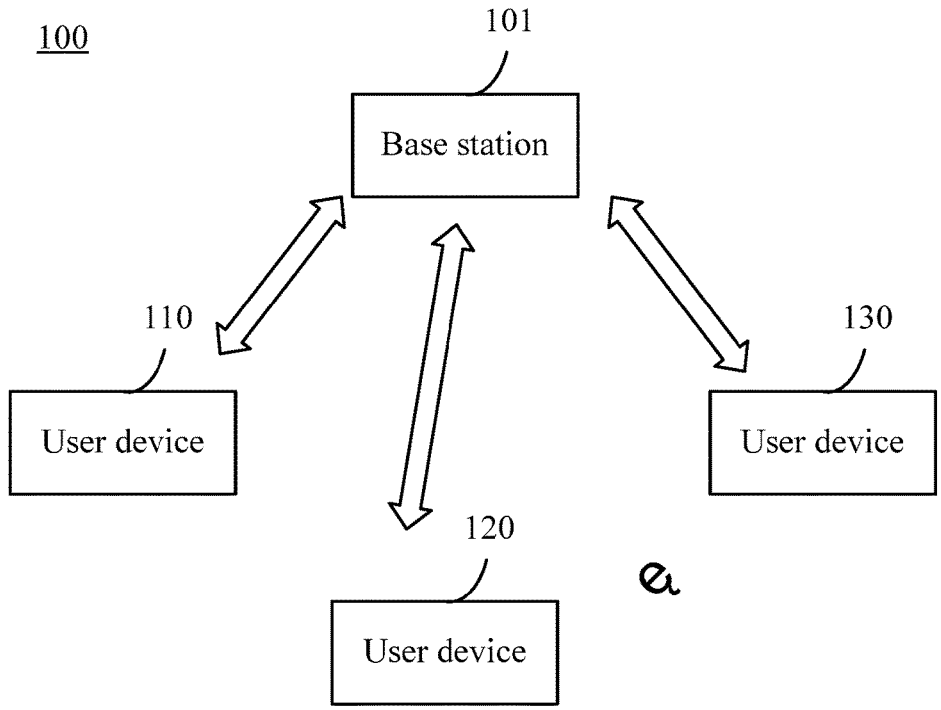

FIG. 1

Determine a modulation and coding scheme (MCS) set based on a higher-layer configuration parameter, where the higher-layer configuration parameter indicates whether data transmission supports a 16 quadrature amplitude modulation (16QAM) modulation scheme, and the MCS set includes one or more of: a first MCS set or a second MCS set — S21

Configure an MCS of data based on the MCS set — S22

FIG. 2

METHOD AND APPARATUS FOR MODULATION AND CODING SCHEME CONFIGURATION BASED ON HIGHER LAYER PARAMETER

This application is a continuation of International Application No. PCT/2020/136444, filed Dec. 15, 2020, which claims priority to Chinese Patent Application No. 202010089169.4 filed with the China National Intellectual Property Administration (CNIPA) on Feb. 12, 2020, the disclosure of each of which are incorporated herein by reference in their entirety.

TECHNICAL FIELD

The present application relates to the field of wireless communication networks, and specifically, to a configuration method and apparatus, a receiving method and apparatus, a device, and a storage medium.

BACKGROUND

In Narrowband Internet of Things (NB-IoT) technology of Release-16, the maximum modulation scheme supports quadrature phase-shift keying (QPSK) modulation. In Release-17, NB-IoT upgrades the maximum modulation scheme to 16 quadrature amplitude modulation (16QAM) to support higher data transmission rates. However, when the maximum modulation scheme is upgraded from the QPSK modulation to the 16QAM modulation, the modulation and coding scheme (MCS) in the related art cannot satisfy the modulation and coding requirements of data.

SUMMARY

The present application provides a configuration method and apparatus, a receiving method and apparatus, a device, and a storage medium.

In an embodiment, the present application provides a configuration method. The configuration method includes: sending a higher-layer configuration parameter; determining an MCS set based on the higher-layer configuration parameter; and configuring MCS of data based on the MCS set. The higher-layer configuration parameter indicates whether data transmission supports a 16QAM modulation scheme, and the MCS set includes at least one of: a first MCS set or a second MCS In an embodiment, the present application provides a receiving method. The receiving method includes the following: receiving a higher-layer configuration parameter; and determining MCS set based on the higher-layer configuration parameter.

The higher-layer configuration parameter indicates whether data transmission supports a 16QAM modulation scheme, and the MCS set includes one or more of: a first MCS set or a second MCS set.

In an embodiment, the present application provides a configuration apparatus. The configuration apparatus includes a sending module, a first determination module and a first configuration module.

The sending module is configured to send a higher-layer configuration parameter.

The first determination module is configured to determine an MCS set based on the higher-layer configuration parameter.

The first configuration module is configured to configure an MCS of data based on the MCS set. The higher-layer configuration parameter indicates whether data transmission supports a 16QAM modulation scheme, and the MCS set includes one or more of: a first MCS set or a second MCS set.

In an embodiment, the present application provides a configuration apparatus. The configuration apparatus includes a receiving module and a second determination module.

The receiving module is configured to receive a higher-layer configuration parameter.

The second determination module is configured to determine an MCS set based on the higher-layer configuration parameter.

The higher-layer configuration parameter indicates whether data transmission supports a 16QAM modulation scheme, and the MCS set includes at least one of: a first MCS set or a second MCS set.

In an embodiment, the present application provides a device. The device includes one or more processors and a memory.

The memory is configured to store one or more programs.

The one or more programs, when executed by the one or more processors, enable the one or more processors to perform the method of any of the embodiments of the present application.

In an embodiment, the present application provides a storage medium. The storage medium is configured to store a computer program, where the computer program, when executed by a processor, performs the method of any of the embodiments of the present application.

BRIEF DESCRIPTION OF DRAWINGS

FIG. 1 is a structural diagram of a wireless network system according to an embodiment of the present application;

FIG. 2 is a flowchart of a configuration method according to an embodiment of the present application;

DETAILED DESCRIPTION

Figure 3:
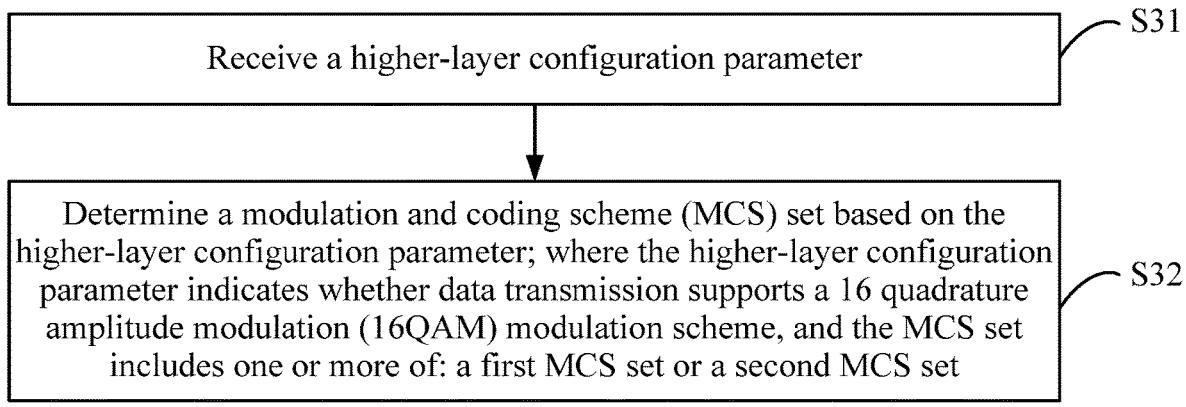
FIG. 3 is a flowchart of a receiving method according to an embodiment of the present application.

To make the objects, solutions and advantages of the present application more apparent, a more detailed description is given hereinafter to illustrate embodiments of the present application in conjunction with implementations and drawings. It is to be noted that if not in collision, the embodiments and features therein in the present application may be combined with each other. The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein. The technical solutions of the present application may be applied to various communication systems such as Global Systems for Mobile Communications (GSM), Code-Division Multiple Access (CDMA) systems, Wideband Code-Division Multiple Access (WCDMA) systems, General Packet Radio Service (GPRS), Long Term Evolution (LTE) systems, LTE Advanced (LTE-A) systems, Universal Mobile Telecommunications System (UMTS), 5th Generation mobile communication (5G) systems and the like, and the embodiments of the present application are not limited thereto. In the present application, the 5G system is used as an example for description. The embodiments of the present application may be applied to wireless networks of different standards. Radio access networks may include different communication nodes in different systems. FIG. 1 is a structural diagram of a wireless network system according to an embodiment of the present application. As shown in FIG. 1, the wireless network system 100 includes a base station 101, a user equipment (UE) 110, a UE 120 and a UE 130. The base station 101 performs wireless communication with the UE 110, the UE 120 and the UE 130, respectively.

It is to be noted that in the embodiments of the present application, the base station may be a device capable of communicating with a user terminal. The base station may be any device having a wireless transceiving function, including, but not limited to, a base station (NodeB), an evolved NodeB (eNodeB), a base station in the 5G communication system, a base station in a future communication system, an access node in a Wi-Fi system, a wireless relay node, a wireless backhaul node and the like. The base station may also be a wireless controller in a cloud radio access network (C-RAN) scenario, the base station may also be a small cell and a transmission reference point (TRP), and the embodiments of the present application are not limited thereto.

In the embodiments of the present application, the user terminal is a device having a wireless transceiving function. The user terminal may be deployed on land, for example, the user terminal may be indoor or outdoor, hand-held, wearable, and vehicle-mounted. The user terminal may also be deployed on the water (for example, on a ship). The UE may also be deployed in the air (for example, on an airplane, a balloon, a satellite and the like). The user terminal may be a mobile phone, a Pad, a computer having a wireless transceiving function, a virtual reality (VR) terminal, an augmented reality (AR) terminal, a wireless terminal for industrial control, a wireless terminal for self-driving, a wireless terminal for remote medicine, a wireless terminal for smart grid, a wireless terminal for transportation safety, a wireless terminal for smart city, a wireless terminal for smart home and the like. The application scenarios are not limited to the embodiments of the present application. The user terminal may also be referred to as a terminal, an access terminal, a UE unit, a UE station, a mobile station, a mobile, a remote station, a remote terminal, a mobile device, a UE terminal, a wireless communication device, a UE agent, a UE device and the like, and the embodiments of the present application are not limited thereto.

In the NB-IoT technology of Release-16, the maximum modulation scheme supports QPSK modulation, and the peak rate of the QPSK modulation scheme is 126.8 kilobits per second. In Release-17, NB-IoT upgrades the maximum modulation scheme to 16QAM to support higher data transmission rates. However, when the maximum modulation scheme is upgraded from the QPSK modulation to the 16QAM modulation, the existing MCS cannot satisfy the modulation and coding requirements of data, and a new MCS is required. Therefore, in order to support the 16QAM modulation of NB-IoT, a new MCS table needs to be defined.

In an embodiment, the present application provides a configuration method. FIG. 2 is a flowchart of a configuration method according to an embodiment of the present application. The method may be applied to the case of determining the MCS of data based on the modulation scheme. This method may be executed by a configuration apparatus provided by the present application, and the configuration apparatus may be implemented by software and/or hardware. The method is applied to a first communication node.

As shown in FIG. 2, the configuration method provided by this embodiment of the present application mainly includes S21 and S22.

In S21, an MCS set is determined based on a higher-layer configuration parameter, where the higher-layer configuration parameter indicates whether data transmission supports a 16QAM modulation scheme, and the MCS set includes one or more of: a first MCS set or a second MCS set.

In S22, an MCS of data is configured based on the MCS set.

In this embodiment, the first communication node may be any base station. In this embodiment, the MCS set may be a correspondence among an MCS, a modulation scheme and a transport block size (TBS). Specifically, the MCS set includes multiple MCSs, and each MCS corresponds to one modulation scheme and one TBS. In the first MCS set, the highest modulation scheme is 16QAM. In the second MCS set, the highest modulation scheme is QPSK.

It is to be noted that the first MCS set and the second MCS set are for distinguishing sets corresponding to different modulation schemes, are not intended to define two actual sets, and may also be two subsets in one set or two different correspondences in one set. The first MCS set and the second MCS set are expressions for distinguishing from each other and are not intended to limit the protection scope of the present application.

In this embodiment, the MCS set may be represented in the form of a table or in other ways, and this embodiment is intended to be illustrative and not limiting.

Further, the first communication node determines an MCS table based on the higher-layer configuration parameter and then configures the MCS of the data based on the MCS table. The higher-layer configuration parameter is configured by the first communication node, and the specific configuration mode is not limited in this embodiment.

In this embodiment, the MCS set includes T MCSs, and each MCS corresponds to one modulation scheme and one TBS. Therefore, when one MCS is determined, the TBS and the modulation scheme of data may be determined. When a communication node configures the MCS of data, one of the T MCSs is selected to code and modulate the data.

In this embodiment, the highest modulation scheme of the first MCS set is 16QAM, and the highest modulation scheme of the second MCS set is QPSK.

The second MCS set is an MCS set defined in the standard protocol of Release 16 (the latest version available).

It is to be noted that in NB-IoT, the second MCS set satisfies the following correspondence: MCS indexes 0 to 13 correspond to TBS indexes 0 to 13, respectively, the modulation scheme is QPSK, and the indexes are serial numbers, where the TBS is the number of bits of one data transport block.

In the TBS table, different TBS indexes correspond to different TBSs, and the TBS table is defined in the existing standard protocol.

In an example embodiment, the operation where the MCS set is determined based on the higher-layer configuration parameter includes the following operations.

In a case where the data transmission supports the 16QAM modulation scheme, the MCS set is the first MCS set or the second MCS set.

In a case where the data transmission does not support the 16QAM modulation scheme, the MCS set is the second MCS set.

In this embodiment, when the data transmission supports the 16QAM modulation scheme, 16QAM may be used in data transmission; and when the data transmission does not support the 16QAM modulation scheme, only a modulation scheme whose order is lower than that of 16QAM may be used in data transmission, such as QPSK.

Further, in a case where the data transmission supports the 16QAM modulation scheme, configuring the MCS of the data based on the first MCS set or the second MCS set means that the MCS of the data may be configured using the first MCS set or the second MCS set in data transmission.

Further, in a case where the data transmission does not support the 16QAM modulation scheme, configuring the MCS of the data based on the second MCS set means that the MCS of the data may be configured using the second MCS set in data transmission.

In this embodiment, since the 16QAM has a higher modulation order, better channel conditions are required during demodulation, and poor channel conditions are not suitable for 16QAM demodulation. Therefore, when the higher-layer configuration parameter P indicates that the data transmission supports 16QAM, the first MCS set or the second MCS set may be used to configure the MCS of the data in data transmission. When the higher-layer configuration parameter P indicates that the data transmission does not support 16QAM, only the second MCS set may be used to configure the MCS of the data.

In an example embodiment, the operation where in a case where the data transmission supports the 16QAM modulation scheme, the MCS set is the first MCS set or the second MCS set includes the following operations.

In a case where the data transmission supports the 16QAM modulation scheme and the number of repetitions of a physical shared channel is less than or equal to a preset threshold, the MCS set is the first MCS set.

In a case where the data transmission supports the 16QAM modulation scheme and the number of repetitions of the physical shared channel is greater than the preset threshold, the MCS set is the second MCS set.

In this embodiment, in a case where the data transmission supports the 16QAM modulation scheme, the maximum number of repetitions of the physical shared channel is greater than or equal to 1024.

In an example embodiment, the number of repetitions and the MCS set are indicated using a repetition number field in downlink control information.

Further, in a case where the data transmission supports the 16QAM modulation scheme, the number of repetitions and the MCS set are indicated using the repetition number field in the downlink control information.

The repetition number field includes 4 bits of information and has 16 values, and each value corresponds to one repetition number and one MCS table.

Further, the repetition number field includes H values, where J values among the H values correspond to the first MCS set, the remaining H-J values among the H values correspond to the second MCS set, J is an integer greater than or equal to 1, and H is an integer greater than or equal to 1.

For example, the value of H is 16.

In an example embodiment, the first MCS set and the second MCS set satisfies one of the following relationships.

For the second MCS set, TBS indexes of the first MCS set are obtained by removing N TBS indexes from the second MCS set and adding N+2 TBS indexes to the second MCS set, where the removed TBS indexes are less than or equal to TBS 13, the added TBS indexes are greater than TBS 13, and N is an integer greater than or equal to 0.

Based on the second MCS set, the TBS indexes of the first MCS set are obtained by reserving M TBS indexes of the second MCS set and adding T TBS indexes to the second MCS set, where the reserved TBS indexes are less than or equal to TBS 13, the added TBS indexes are greater than TBS 13, T+M=16, and both T and M are integers greater than or equal to 0.

In an example embodiment, the operation of removing N TBS indexes includes one of the following operations.

N odd TBS indexes are removed.

N even TBS indexes are removed.

N continuous TBS indexes are removed.

In an example embodiment, in the first MCS set, the number of MCSs corresponding to the 16QAM modulation scheme is K, and the number of MCSs corresponding to a QPSK modulation scheme is L, where K is greater than or equal to L, and both K and L are integers greater than or equal to 0. Alternatively, the first MCS set only includes MCSs for the 16QAM modulation scheme. In this embodiment, the number of MCSs corresponding to the 16QAM modulation scheme is greater than or equal to the number of MCSs corresponding to the QPSK modulation scheme. For example, when the first MCS table includes 16 MCSs and two modulation schemes QPSK and 16QAM, the number of MCSs corresponding to the 16QAM modulation scheme is greater than or equal to 8.

In an example embodiment, the maximum TBS index in the first MCS set is TBS 21 or TBS 22. In this embodiment, in the first MCS table, the maximum TBS index is TBS 21 or TBS 22, and the corresponding modulation scheme is 16QAM.

In an example embodiment, for an in-band deployment mode, in a case where the MCS set is the first MCS set, a configurable TBS index is less than or equal to TBS 16.

In an example embodiment, for an in-band deployment mode, the first MCS set includes 16 MCSs, where the 16 MCSs correspond to TBS indexes TBS 0 to TBS 15.

In an example embodiment, for an in-band deployment mode, the first MCS set includes 16 MCSs, where the 16 MCSs correspond to 15 TBS indexes in TBS indexes TBS 0 to TBS 16, and the 15 TBS indexes include TBS 16.

In an example embodiment, for uplink transmission, in the first MCS set, MCS indexes MCS 0 to MCS 10 correspond to TBS indexes TBS 0 to TBS 10, respectively, and the modulation scheme corresponding to the MCS indexes MCS 0 to MCS 10 is the QPSK modulation scheme; and MCS indexes MCS 11 to MCS 15 correspond to TBS indexes TBS 9 to TBS 13, respectively, and the modulation scheme corresponding to the MCS indexes MCS 11 to MCS 15 is the 16QAM modulation scheme.

In an embodiment, the present application provides a receiving method. FIG. 3 is a flowchart of a receiving method according to an embodiment of the present application. The method may be applied to the case of determining the MCS of data based on the modulation scheme. This method may be executed by a receiving apparatus provided by the present application, and the receiving apparatus may be implemented by software and/or hardware. The method is applied to a second communication node.

As shown in FIG. 3, the receiving method provided by this embodiment of the present application mainly includes S31 and S32.

In S31, a higher-layer configuration parameter is received.

In S31, an MCS set is determined based on the higher-layer configuration parameter, where the higher-layer configuration parameter indicates whether data transmission supports a 16QAM modulation scheme, and the MCS set includes one or more of: a first MCS set or a second MCS set.

In this embodiment, in a case where the second communication node is a UE, the higher-layer configuration parameter is configured by a first communication node and sent to the second communication node. The UE determines an MCS table based on the higher-layer configuration parameter and then configures the MCS of the data based on the MCS table.

In an example embodiment, the operation where the MCS set is determined based on the higher-layer configuration parameter includes the following operation: in a case where the data transmission supports the 16QAM modulation scheme, the MCS set is determined according to a repetition number field in downlink control information.

In an example embodiment, the operation where in a case where the data transmission supports the 16QAM modulation scheme, the MCS set is determined according to the repetition number field in the downlink control information includes the following operation: in a case where the data transmission supports the 16QAM modulation scheme and the number of repetitions of a physical shared channel indicated by the repetition number field is less than or equal to a preset threshold, the MCS set is determined to be the first MCS set; and in a case where the data transmission supports the 16QAM modulation scheme and the number of repetitions of the physical shared channel indicated by the repetition number field is greater than the preset threshold, the MCS set is determined to be the second MCS set.

Further, in a case where the data transmission does not support the 16QAM modulation scheme, the MCS set is the second MCS set.

In this embodiment, when the data transmission supports the 16QAM modulation scheme, 16QAM may be used in data transmission; and when the data transmission does not support the 16QAM modulation scheme, only a modulation scheme whose order is lower than that of 16QAM may be used in data transmission, such as QPSK.

In an example embodiment, the operation where in a case where the data transmission supports the 16QAM modulation scheme, the MCS set is determined according to the repetition number field in the downlink control information includes the following operation: in a case where the data transmission supports the 16QAM modulation scheme and the value of the repetition number field corresponds to the first MCS set, the MCS set is determined to be the first MCS set; and in a case where the data transmission supports the 16QAM modulation scheme and the value of the repetition number field corresponds to the second MCS set, the MCS set is determined to be the second MCS set.

In this embodiment, the MCS table includes T MCSs, and each MCS corresponds to one modulation scheme and one TBS. Therefore, when one MCS is determined, the TBS and the modulation scheme of data may be determined.

In this embodiment, the highest modulation scheme of the first MCS table is 16QAM, and the highest modulation scheme of the second MCS table is QPSK.

In this embodiment, in a case where the data transmission supports the 16QAM modulation scheme, the maximum number of repetitions of the physical shared channel is greater than or equal to 1024.

The repetition number field includes 4 bits of information and has 16 values, and each value corresponds to one repetition number and one MCS table.

Further, the repetition number field includes H values, where J values among the H values correspond to the first MCS set, the remaining H-J values among the H values correspond to the second MCS set, J is an integer greater than or equal to 1, and H is an integer greater than or equal to 1. Alternatively, the first MCS set only includes MCSs for the 16QAM modulation scheme. For example, the value of H is 16.

In an example embodiment, the first MCS set and the second MCS set satisfy one of the following relationships.

For the second MCS set, TBS indexes of the first MCS set are obtained by removing N TBS indexes from the second MCS set and adding N+2 TBS indexes to the second MCS set, where the removed TBS indexes are less than or equal to TBS 13, the added TBS indexes are greater than TBS 13, and N is an integer greater than or equal to 0.

Based on the second MCS set, the TBS indexes of the first MCS set are obtained by reserving M TBS indexes of the second MCS set and adding T TBS indexes to the second MCS set, where the reserved TBS indexes are less than or equal to TBS 13, the added TBS indexes are greater than TBS 13, T+M=16, and both T and M are integers greater than or equal to 0.

In an example embodiment, the operation of removing N TBS indexes includes one of the following operations.

N odd TBS indexes are removed.
N even TBS indexes are removed.
N continuous TBS indexes are removed.

In an example embodiment, in the first MCS set, the number of MCSs corresponding to the 16QAM modulation scheme is K, and the number of MCSs corresponding to a QPSK modulation scheme is L, where K is greater than or equal to L, and both K and L are integers greater than or equal to 0.

In this embodiment, the number of MCSs corresponding to the 16QAM modulation scheme is greater than or equal to the number of MCSs corresponding to the QPSK modulation scheme. For example, when the first MCS table includes 16 MCSs and two modulation schemes QPSK and 16QAM, the number of MCSs corresponding to the 16QAM modulation scheme is greater than or equal to 8.

In an example embodiment, the maximum TBS index in the first MCS set is TBS 21 or TBS 22. In this embodiment, in the first MCS table, the maximum TBS index is TBS 21 or TBS 22, and the corresponding modulation scheme is 16QAM.

In an example embodiment, for an in-band deployment mode, in a case where the MCS set is the first MCS set, the TBS index is less than or equal to TBS 16.

In an example embodiment, for an in-band deployment mode, the first MCS set includes 16 MCSs, where the 16 MCSs correspond to TBS indexes TBS 0 to TBS 15.

In an example embodiment, for an in-band deployment mode, the first MCS set includes 16 MCSs, where the 16 MCSs correspond to 15 TBS indexes in TBS indexes TBS 0 to TBS 16, and the 15 TBS indexes include TBS 16.

In an example embodiment, for uplink transmission, in the first MCS set, MCS indexes MCS 0 to MCS 10 correspond to TBS indexes TBS 0 to TBS 10, respectively, and the modulation scheme corresponding to the MCS indexes MCS 0 to MCS 10 is the QPSK modulation scheme; and MCS indexes MCS 11 to MCS 15 correspond to TBS indexes TBS 9 to TBS 13, respectively, and the modulation scheme corresponding to the MCS indexes MCS 11 to MCS 15 is the 16QAM modulation scheme.

In an application embodiment, the present application provides a method for configuring a modulation and coding scheme. The method includes: determining an MCS table based on a higher-layer configuration parameter; and configuring an MCS of data based on the MCS table. Where the higher-layer configuration parameter indicates whether data transmission supports a 16QAM mode, and the MCS table includes one or more of the following: a first MCS table or a second MCS table.

In this embodiment, the MCS table includes T MCSs, and each MCS corresponds to one modulation scheme and one TBS. Therefore, when one MCS is determined, the TBS and the modulation scheme of data may be determined. When the first communication node configures the MCS of data, one of the T MCSs is selected to code and modulate the data.

In this embodiment, the highest modulation scheme of the first MCS table is 16QAM, and the highest modulation scheme of the second MCS table is QPSK.

The second MCS table is an MCS table defined in the standard protocol of Release 16 (the latest version available). In NB-IoT, the second MCS table does not have a concrete table but satisfies the following correspondence: MCS indexes 0 to 13 correspond to TBS indexes 0 to 13, respectively, the modulation scheme is QPSK, and the indexes are serial numbers, where the TBS is the number of bits of one data transport block. In the TBS table, different TBS indexes correspond to different TBSs, and the TBS table is defined in the existing standard protocol.

In this embodiment, the first communication node sends the higher-layer configuration parameter P to the second communication node, and the higher-layer configuration parameter P directly or indirectly indicates whether the data transmission supports the 16QAM modulation. Specifically, the higher-layer configuration parameter P may be a parameter signaling that directly indicates whether the data transmission supports the 16QAM modulation; the higher-layer configuration parameter P may also be a parameter signaling that indirectly indicates whether the data transmission supports the 16QAM modulation, for example, the higher-layer configuration parameter P indicates whether the data transmission supports the first MCS table, if the data transmission supports the first MCS table, then the higher-layer configuration parameter P indirectly indicates that the data transmission supports the 16QAM modulation, and if the data transmission does not support the first MCS table, the higher-layer configuration parameter P indirectly indicates that the data transmission does not support the 16QAM modulation.

In this embodiment, when the data transmission supports the 16QAM modulation scheme, the 16QAM modulation scheme that is the highest modulation scheme may be used in data transmission, and other modulation schemes may also be used; and when the data transmission does not support the 16QAM modulation scheme, only a modulation scheme whose order is lower than that of 16QAM may be used in data transmission, such as QPSK.

In this embodiment, in a case where the data transmission supports the 16QAM modulation scheme, the MCS table is a first MCS table or a second MCS table; in a case where the data transmission does not support the 16QAM modulation scheme, the MCS table is the second MCS table.

In this embodiment, since 16QAM has a higher modulation order, better channel conditions are required during demodulation, and poor channel conditions are not suitable for 16QAM demodulation. Therefore, when the data transmission supports the 16QAM modulation scheme, the data transmission may use the first MCS table to support the 16QAM modulation, and the data transmission may use the second MCS table to not support the 16QAM modulation. There are two schemes for the dynamic handover of the first MCS table and the second MCS table.

In MCS table handover scheme one, in a case where the data transmission supports the 16QAM modulation scheme, if the number of repetitions of a physical shared channel is less than or equal to a preset threshold, the MCS of the data is configured based on the first MCS table, and if the number of repetitions of the physical shared channel is greater than the preset threshold value, the MCS of the data is configured based on the second MCS table.

Specifically, in a case where the data transmission supports the 16QAM modulation scheme, if the number of repetitions of the physical shared channel is less than or equal to a threshold, that is, the number of repetitions is smaller, indicating that the channel conditions are better, the MCS of the data is configured based on the first MCS table; if the number of repetitions of the physical shared channel is greater than the threshold, indicating that the channel conditions are poor, the MCS of the data is configured based on the second MCS table, where the threshold is a fixed number of repetitions or configured by a base station.

In MCS table handover scheme two, in a case where the data transmission supports the 16QAM modulation scheme, the number of repetitions and the MCS table are indicated using the repetition number field in downlink control information, where the repetition number field includes H values, J values correspond to the first MCS table, the remaining H-J values correspond to the second MCS table, and J is greater than or equal to 1.

Specifically, in a case where the data transmission supports the 16QAM modulation scheme, the selection of the number of repetitions of the physical shared channel and the selection of the MCS table are jointly indicated by the repetition number field. The repetition number field has H values, each value corresponds to one number of repetitions and one MCS table, where J values correspond to the first MCS table, and the remaining H-J values correspond to the second MCS table, and the specific correspondence is determined by the indication table of a repetition number field.

Further, since the higher-layer configuration parameter P does not indicate the support for the 16QAM modulation if there is a large number of repetitions, J values of the repetition number field may correspond to the first MCS table and small numbers of repetitions to support the 16QAM modulation, and the remaining H-J values correspond to the second MCS table and H-J numbers of repetitions. For example, when H=16 and J=2, the maximum two values of the repetition number field correspond to the first MCS table, and the maximum two values correspond to the numbers of repetitions 1 and 2, respectively; the smaller 14 values of the repetition number field correspond to the second MCS table, and the smaller 14 values correspond to 14 different numbers of repetitions.

In this embodiment, when the base station is configured with hybrid automatic repeat request (HARQ), if the first HARQ transmission of a data transport block adopts a low number of repetitions, the size of the data transport block is larger than TBS 13 and the first HARQ transmission is not correctly decoded, the base station may adopt the following two operation manners.

In manner one, the data transport block is abandoned, and the HARQ retransmission of the transport block is not continued; the number of repetitions and the MCS are reselected, and a new data transport block is configured.

In manner two, the number of repetitions is not increased in HARQ retransmission or the increased number of repetitions in the HARQ retransmission does not exceed the maximum number of repetitions supported by the first MCS table. For MCS table handover scheme 1, the maximum number of repetitions supported by the first MCS table is the threshold, and for MCS table handover scheme 2, the maximum number of repetitions supported by the first MCS table is the maximum number of repetitions corresponding to the first MCS table in the indication table of the repetition number field.

In this embodiment, the physical shared channel is a physical downlink shared channel (PDSCH) or a physical uplink shared channel (PUSCH).

In this embodiment, the first MCS table and the second MCS table satisfy the following relationship: for the second MCS table, TBS indexes of the first MCS table are obtained by removing N TBS indexes of the second MCS table and adding N+2 TBS indexes to the second MCS table, where the removed TBS indexes are less than or equal to TBS 13, the added TBS indexes are greater than TBS 13, and N is an integer greater than or equal to 0.

Specifically, in NB-IoT, the second MCS table includes 14 MCSs, and MCS indexes 0 to 13 correspond to TBS indexes 0 to 13, respectively. Based on the second MCS table, N TBS indexes are removed from the second MCS table and N+2 TBS indexes are added to the second MCS table to obtain the TBS indexes included in the first MCS table, where the added TBS indexes are greater than TBS 13. The first MCS table includes 16 TBSs corresponding to MCS indexes 0 to 15.

In this embodiment, for the second MCS table, the N TBS indexes may be removed according to one of the following five schemes.

In TBS removing scheme one, N odd TBS indexes are removed. For example, 6 TBS indexes are removed, including TBS indexes 1, 3, 5, 7, 9 and 11; and accordingly, 8 TBS indexes are added, including TBS indexes 14 to 21.

In TBS removing scheme two, N even TBS indexes are removed. For example, 6 TBS indexes are removed, including TBS indexes 2, 4, 6, 8, 10 and 12; and accordingly, 8 TBS indexes are added, including TBS indexes 14 to 21.

In TBS removing scheme three, N continuous TBS indexes are removed. For example, 7 TBS indexes are removed, including TBS indexes 1 to 7; and accordingly, 9 TBS indexes are added, including TBS indexes 14 to 22.

In TBS removing scheme four, N1 continuous TBS indexes and N2 odd TBS indexes are removed, where N1+N2=N.

In TBS removing scheme five, N1 continuous TBS indexes and N2 even TBS indexes are removed, where N1+N2=N.

In this embodiment, the first MCS table and the second MCS table may also satisfy the following relationship: for the second MCS table, the TBS indexes of the first MCS table are obtained by reserving M TBS indexes and adding T TBS indexes, where the reserved TBS indexes are less than or equal to TBS 13, the added TBS indexes are greater than TBS 13, T+M=16, and both T and M are integers greater than or equal to 0.

In this embodiment, for the second MCS table, the M TBS indexes may be reserved according to one of the following five schemes.

In TBS removing scheme one, M odd TBS indexes are reserved.

In TBS removing scheme two, M even TBS indexes are reserved.

In TBS removing scheme three, M continuous TBS indexes are reserved.

In TBS removing scheme four, M1 continuous TBS indexes and M2 odd TBS indexes are reserved, where M1+M2=M.

In TBS removing scheme five, M1 continuous TBS indexes and M2 even TBS indexes are reserved, where M1+M2=M.

In this embodiment, in the first MCS table, the number of MCSs corresponding to the 16QAM modulation scheme is K, and the number of MCSs corresponding to the QPSK modulation scheme is L, where K is greater than or equal to L. That is, the number of MCSs corresponding to the 16QAM modulation scheme is greater than or equal to the number of MCSs corresponding to the QPSK modulation scheme. Assuming that the first MCS table includes 16 MCSs and two modulation schemes QPSK and 16QAM, the number of MCSs corresponding to the 16QAM modulation scheme is greater than or equal to 8.

Further, the first MCS table may also only include MCSs for the 16QAM modulation. Assuming that the first MCS table includes 16 MCSs, the number K of MCSs corresponding to the 16QAM modulation scheme is 16, that is, all 16 MCSs are for the 16QAM modulation.

In this embodiment, in the first MCS table, the maximum TBS index is TBS 21 or TBS 22, and the corresponding modulation scheme is 16QAM.

In this embodiment, for the in-band deployment mode in NB-IoT, the maximum TBS supported in 16QAM modulation does not exceed TBS 16. For the in-band mode, one of the following two schemes for the available MCSs may be adopted.

In in-band mode scheme one, the in-band mode and the stand alone mode share the same 16QAM MCS table (that is, the first MCS table), but in the 16QAM MCS table, the configurable TBS for the in-band mode is less than or equal to TBS 16. That is, for the in-band mode, based on the first MCS table, MCSs corresponding to TBS indexes less than or equal to 16 may be used for configuring data, and MCSs corresponding to TBS indexes greater than 16 are not used for configuring data.

In in-band mode scheme two, for the in-band mode, a 16QAM MCS table dedicated to the in-band mode is adopted, that is, the first MCS table in the in-band mode is adopted, where the first MCS table in the in-band mode includes 16 MCSs, and the 16 MCSs correspond to TBS indexes 0 to 15; or the 16 MCSs correspond to 15 TBS indexes in TBS indexes 0 to 16, and the 15 TBS indexes include TBS index 16.

For uplink transmission, in the first MCS table, MCSs 0 to 10 correspond to TBSs 0 to 10, respectively, and the modulation scheme corresponding to the MCSs 0 to 10 is QPSK; and MCSs 11 to 15 correspond to TBSs 9 to 13, respectively, and the modulation scheme corresponding to the MCSs 11 to 15 is 16QAM. Since the maximum TBS supported by uplink 16QAM modulation is TBS 13, in uplink transmission, the maximum MCS of the first MCS table corresponds to TBS 13.

In an application embodiment, the present application provides an MCS table for supporting a modulation order that is up to the order of 16QAM.

In this embodiment, the second MCS table includes 14 MCSs that are MCSs 0 to 13, respectively, the 14 MCSs correspond to TBSs 0 to 13 sequentially, and the modulation scheme is QPSK.

In this embodiment, based on the second MCS table, N odd TBS indexes are removed and N+2 TBS indexes that are greater than 13 are added to obtain the TBS indexes included in the first MCS table.

Further, in the first MCS table, the MCS indexes and the TBS indexes correspond to each other in one of the following two manners.

In MCS-TBS corresponding manner one, for TBS indexes 0 to 13, the N odd TBS indexes are removed, where the N odd TBS indexes are indexes $I_1, I_2, \ldots,$ and $I_N$, respectively, and the remaining TBS indexes are $J_1, J_2, \ldots,$ and $J_{14-N}$. In the first MCS table, MCS indexes $J_1, J_2, \ldots,$ and $J_{14-N}$ correspond to TBS indexes $J_1, J_2, \ldots,$ and $J_{14-N}$ sequentially, MCS indexes $I_1, I_2, \ldots,$ and $I_N$ correspond to N TBS indexes that are greater than 13, and MCS indexes 14 and 15 correspond to two TBS indexes that are greater than 13.

In MCS-TBS corresponding manner two, in the first MCS table, TBS indexes correspond to MCS indexes 0 to 15 sequentially from small to large.

In this embodiment, in the first MCS table, the number of MCSs corresponding to the 16QAM modulation scheme is K, and the number of MCSs corresponding to the QPSK modulation scheme is L, where K is greater than or equal to L.

In this embodiment, in the first MCS table, the maximum TBS index is TBS 21 or TBS 22, and the corresponding modulation scheme is 16QAM.

In this embodiment, for the in-band mode, based on the first MCS table, MCSs corresponding to TBS indexes less than or equal to 16 may be used for configuring data, and MCSs corresponding to TBS indexes greater than 16 are not used for configuring data.

In this embodiment, the modulation order of QPSK is 2, and the modulation order of 16QAM is 4.

Optionally, there is the first MCS table example one: the N is equal to 6, 6 odd TBS indexes among TBS indexes 0 to 13 are removed, where the 6 odd TBS indexes are TBS indexes 1, 3, 5, 7, 9 and 11, and 8 TBS indexes are added, where the 8 TBS indexes are TBS indexes 14 to 21; the TBS indexes in the first MCS table correspond to MCS indexes 0 to 15 sequentially from small to large. In the first MCS table example one, MCSs corresponding to TBS indexes less than TBS index 10 correspond to the QPSK modulation, and MCSs corresponding to TBS indexes greater than or equal to TBS index 10 correspond to the 16QAM modulation, as shown in Table 1; or MCSs corresponding to TBS indexes less than TBS index 12 correspond to the QPSK modulation, and MCSs corresponding to TBS indexes greater than or equal to TBS index 12 correspond to the 16QAM modulation.

TABLE 1

| MCS Index | Modulation order | TBS Index |
|---|---|---|
| 0 | 2 | 0 |
| 1 | 2 | 2 |

TABLE 1-continued

| MCS Index | Modulation order | TBS Index |
|---|---|---|
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 4 | 16 |
| 11 | 4 | 17 |
| 12 | 4 | 18 |
| 13 | 4 | 19 |
| 14 | 4 | 20 |
| 15 | 4 | 21 |

Optionally, there is the first MCS table example two: the N is equal to 6, 7 odd TBS indexes among TBS indexes 0 to 13 are removed, where the 7 odd TBS indexes are TBS indexes 1, 3, 5, 7, 9, 11 and 13, and 9 TBS indexes are added, where the 9 TBS indexes are TBSs 14 to 22; the TBS indexes in the first MCS table correspond to MCS indexes 0 to 15 sequentially from small to large. In the first MCS table example two, MCSs corresponding to TBS indexes less than TBS index 10 correspond to the QPSK modulation, and MCSs corresponding to TBS indexes greater than or equal to TBS index 10 correspond to the 16QAM modulation, as shown in Table 2; or MCSs corresponding to TBS indexes less than TBS index 12 correspond to the QPSK modulation, and MCSs corresponding to TBS indexes greater than or equal to TBS index 12 correspond to the 16QAM modulation.

TABLE 2

| MCS Index | Modulation order | TBS Index |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |
| 8 | 4 | 15 |
| 9 | 4 | 16 |
| 10 | 4 | 17 |
| 11 | 4 | 18 |
| 12 | 4 | 19 |
| 13 | 4 | 20 |
| 14 | 4 | 21 |
| 15 | 4 | 22 |

Optionally, there is the first MCS table example three: the N is equal to 2, 2 odd TBS indexes among TBS indexes 0 to 13 are removed, where the 2 odd TBS indexes are TBS indexes 1 and 3, and 4 TBS indexes are added, where the 4 TBS indexes are TBS indexes 15, 17, 19 and 21; the TBS indexes in the first MCS table correspond to MCS indexes 0 to 15 sequentially from small to large.

In the first MCS table example three, MCSs corresponding to TBS indexes less than TBS index 10 correspond to the QPSK modulation, and MCSs corresponding to TBS indexes greater than or equal to TBS index 10 correspond to the 16QAM modulation, as shown in Table 3; or MCSs corresponding to TBS indexes less than TBS index 11 correspond to the QPSK modulation, and MCSs corresponding to TBS indexes greater than or equal to TBS index 11 correspond to the 16QAM modulation.

TABLE 3

| MCS Index | Modulation order | TBS Index |
|---|---|---|
| 0 | 2 | 0 |
| 1 | 2 | 2 |
| 2 | 2 | 4 |
| 3 | 2 | 5 |
| 4 | 2 | 6 |
| 5 | 2 | 7 |
| 6 | 2 | 8 |
| 7 | 2 | 9 |
| 8 | 4 | 10 |
| 9 | 4 | 11 |
| 10 | 4 | 12 |
| 11 | 4 | 13 |
| 12 | 4 | 15 |
| 13 | 4 | 17 |
| 14 | 4 | 19 |
| 15 | 4 | 21 |

Optionally, there is the first MCS table example four: the N is equal to 3, 3 odd TBS indexes among TBS indexes 0 to 13 are removed, where the 3 odd TBS indexes are TBS indexes 1, 3 and 5, and 5 TBS indexes are added, where the 5 TBS indexes are TBS indexes 14, 16, 18, 20 and 24; the TBS indexes in the first MCS table correspond to MCS indexes 0 to 15 sequentially from small to large.

In the first MCS table example four, MCSs corresponding to TBS indexes less than TBS index 10 correspond to the QPSK modulation, and MCSs corresponding to TBS indexes greater than or equal to TBS index 10 correspond to the 16QAM modulation, as shown in Table 4; or MCSs corresponding to TBS indexes less than TBS index 11 correspond to the QPSK modulation, and MCSs corresponding to TBS indexes greater than or equal to TBS index 11 correspond to the 16QAM modulation.

TABLE 4

| MCS Index | Modulation order | TBS Index |
|---|---|---|
| 0 | 2 | 0 |
| 1 | 2 | 2 |
| 2 | 2 | 4 |
| 3 | 2 | 6 |
| 4 | 2 | 7 |
| 5 | 2 | 8 |
| 6 | 2 | 9 |
| 7 | 4 | 10 |
| 8 | 4 | 11 |
| 9 | 4 | 12 |
| 10 | 4 | 13 |
| 11 | 4 | 14 |
| 12 | 4 | 16 |
| 13 | 4 | 18 |
| 14 | 4 | 20 |
| 15 | 4 | 22 |

In an application embodiment, the present application provides another MCS table for supporting a modulation order that is up to the order of 16QAM.

In this embodiment, the second MCS table includes 14 MCSs that are MCSs 0 to 13, respectively, the 14 MCSs correspond to TBSs 0 to 13, respectively, and the modulation scheme is QPSK. In this embodiment, based on the second MCS table, N even TBS indexes are removed and N+2 TBS indexes that are greater than 13 are added to obtain the TBS indexes included in the first MCS table.

Further, in the first MCS table, the MCS indexes and the TBS indexes correspond to each other in one of the following two manners:

In MCS-TBS corresponding manner one, for TBS indexes 0 to 13, the N even TBS indexes are removed, where the N even TBS indexes are indexes $I_1, I_2, \ldots,$ and $I_N$, respectively, and the remaining TBS indexes are $J_1, J_2, \ldots,$ and $J_{14-N}$. In the first MCS table, MCS indexes $J_1, J_2, \ldots,$ and $J_{14-N}$ correspond to TBS indexes $J_1, J_2, \ldots,$ and $J_{14-N}$ sequentially, MCS indexes $I_1, I_2, \ldots,$ and $I_N$ correspond to N TBS indexes that are greater than 13, and MCS indexes 14 and 15 correspond to two TBS indexes that are greater than 13.

In MCS-TBS corresponding manner two, in the first MCS table, TBS indexes correspond to MCS indexes 0 to 15 sequentially from small to large.

In this embodiment, in the first MCS table, the number of MCSs corresponding to the 16QAM modulation scheme is K, and the number of MCSs corresponding to the QPSK modulation scheme is L, where K is greater than or equal to L.

In this embodiment, in the first MCS table, the maximum TBS index is TBS 21 or TBS 22, and the corresponding modulation scheme is 16QAM.

In this embodiment, for the in-band mode, based on the first MCS table, MCSs corresponding to TBS indexes less than or equal to 16 may be used for configuring data, and MCSs corresponding to TBS indexes greater than 16 are not used for configuring data.

In this embodiment, the modulation order of QPSK is 2, and the modulation order of 16QAM is 4.

Optionally, there is the first MCS table example one: the N is equal to 6, 6 even TBS indexes among TBS indexes 0 to 13 are removed, where the 6 even TBS indexes are TBS indexes 2, 4, 6, 8, 10 and 12, and 8 TBS indexes are added, where the 8 TBS indexes are TBS indexes 14 to 21; the TBS indexes in the first MCS table correspond to MCS indexes 0 to 15 sequentially from small to large.

In the first MCS table example one, MCSs corresponding to TBS indexes less than or equal to TBS index 9 correspond to the QPSK modulation, and MCSs corresponding to TBS indexes greater than or equal to TBS index 11 correspond to the 16QAM modulation, as shown in Table 5.

TABLE 5

| MCS Index | Modulation order | TBS Index |
|---|---|---|
| 0 | 2 | 0 |
| 1 | 2 | 1 |
| 2 | 2 | 3 |
| 3 | 2 | 5 |
| 4 | 2 | 7 |
| 5 | 2 | 9 |
| 6 | 4 | 11 |
| 7 | 4 | 13 |
| 8 | 4 | 14 |
| 9 | 4 | 15 |
| 10 | 4 | 16 |
| 11 | 4 | 17 |
| 12 | 4 | 18 |
| 13 | 4 | 19 |
| 14 | 4 | 20 |
| 15 | 4 | 21 |

Optionally, there is the first MCS table example two: the N is equal to 7, 7 even TBS indexes among TBS indexes 0 to 13 are removed, where the 7 even TBS indexes are TBS indexes 0, 2, 4, 6, 8, 10 and 8, and 9 TBS indexes are added, where the 9 TBS indexes are TBS indexes 14 to 21; the TBS indexes in the first MCS table correspond to MCS indexes 0 to 15 sequentially from small to large.

In the first MCS table example two, MCSs corresponding to TBS indexes less than or equal to TBS index 9 correspond to the QPSK modulation, and MCSs corresponding to TBS indexes greater than or equal to TBS index 11 correspond to the 16QAM modulation, as shown in Table 6.

TABLE 6

| MCS Index | Modulation order | TBS Index |
|---|---|---|
| 0 | 2 | 1 |
| 1 | 2 | 3 |
| 2 | 2 | 5 |
| 3 | 2 | 7 |
| 4 | 2 | 9 |
| 5 | 4 | 11 |
| 6 | 4 | 13 |
| 7 | 4 | 14 |
| 8 | 4 | 15 |
| 9 | 4 | 16 |
| 10 | 4 | 17 |
| 11 | 4 | 18 |
| 12 | 4 | 19 |
| 13 | 4 | 20 |
| 14 | 4 | 21 |
| 15 | 4 | 22 |

Optionally, there is the first MCS table example three: the N is equal to 6, 6 even TBS indexes among TBS indexes 0 to 13 are removed, where the 6 even TBS indexes are TBS indexes 0, 2, 4, 6, 8 and 10, and 8 TBS indexes are added, where the 8 TBS indexes are TBS indexes 14 to 21; the TBS indexes in the first MCS table correspond to MCS indexes 0 to 15 sequentially from small to large.

In the first MCS table example three, MCSs corresponding to TBS indexes less than or equal to TBS index 9 correspond to the QPSK modulation, and MCSs corresponding to TBS indexes greater than or equal to TBS index 11 correspond to the 16QAM modulation, as shown in Table 7.

TABLE 7

| MCS Index | Modulation order | TBS Index |
|---|---|---|
| 0 | 2 | 1 |
| 1 | 2 | 3 |
| 2 | 2 | 5 |
| 3 | 2 | 7 |
| 4 | 2 | 9 |
| 5 | 4 | 11 |
| 6 | 4 | 12 |
| 7 | 4 | 13 |
| 8 | 4 | 14 |
| 9 | 4 | 15 |
| 10 | 4 | 16 |
| 11 | 4 | 17 |
| 12 | 4 | 18 |
| 13 | 4 | 19 |
| 14 | 4 | 20 |
| 15 | 4 | 21 |

Optionally, there is the first MCS table example four: the N is equal to 2, 2 even TBS indexes among TBS indexes 0 to 13 are removed, where the 2 even TBS indexes are TBS indexes 2 and 4, and 4 TBS indexes are added, where the 4 TBS indexes are TBS indexes 15, 17, 19 and 21; the TBS indexes in the first MCS table correspond to MCS indexes 0 to 15 sequentially from small to large.

In the first MCS table example four, MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 8; or MCSs corresponding to TBS indexes less than or equal to TBS index 11 correspond to the QPSK modulation, and MCSs corresponding to TBS indexes greater than or equal to TBS index 11 correspond to the 16QAM modulation.

TABLE 8

| MCS Index | Modulation order | TBS Index |
|---|---|---|
| 0 | 2 | 0 |
| 1 | 2 | 1 |
| 2 | 2 | 3 |
| 3 | 2 | 5 |
| 4 | 2 | 6 |
| 5 | 2 | 7 |
| 6 | 2 | 8 |
| 7 | 2 | 9 |
| 8 | 4 | 10 |
| 9 | 4 | 11 |
| 10 | 4 | 12 |
| 11 | 4 | 13 |
| 12 | 4 | 15 |
| 13 | 4 | 17 |
| 14 | 4 | 19 |
| 15 | 4 | 21 |

Optionally, there is the first MCS table example five: the N is equal to 3, 3 even TBS indexes among TBS indexes 0 to 13 are removed, where the 3 even TBS indexes are TBS indexes 2, 4 and 6, and 5 TBS indexes are added, where the 5 TBS indexes are TBS indexes 14, 16, 18, 20 and 22; the TBS indexes in the first MCS table correspond to MCS indexes 0 to 15 sequentially from small to large.

In the first MCS table example five, MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 9; or MCSs corresponding to TBS indexes less than or equal to TBS index 11 correspond to the QPSK modulation, and MCSs corresponding to TBS indexes greater than or equal to TBS index 11 correspond to the 16QAM modulation.

TABLE 9

| MCS Index | Modulation order | TBS Index |
|---|---|---|
| 0 | 2 | 0 |
| 1 | 2 | 1 |
| 2 | 2 | 3 |
| 3 | 2 | 5 |
| 4 | 2 | 7 |
| 5 | 2 | 8 |
| 6 | 2 | 9 |
| 7 | 4 | 10 |
| 8 | 4 | 11 |
| 9 | 4 | 12 |
| 10 | 4 | 13 |
| 11 | 4 | 14 |
| 12 | 4 | 16 |
| 13 | 4 | 18 |
| 14 | 4 | 20 |
| 15 | 4 | 22 |

In an application embodiment, the present application provides another MCS table for supporting a modulation order that is up to the order of 16QAM.

In this embodiment, the second MCS table includes 14 MCSs that are MCSs 0 to 13, respectively, the 14 MCSs correspond to TBSs 0 to 13, respectively, and the modulation scheme is QPSK.

In this embodiment, based on the second MCS table, N continuous TBS indexes are removed and N+2 TBS indexes that are greater than 13 are added to obtain the TBS indexes included in the first MCS table.

Further, in the first MCS table, the MCS indexes and the TBS indexes correspond to each other in one of the following two manners.

In MCS-TBS corresponding manner one, for TBS indexes 0 to 13, the N continuous TBS indexes are removed, where the N even TBS indexes are indexes $I_1, I_2, \ldots,$ and $I_N$, respectively, and the remaining TBS indexes are $J_1, J_2, \ldots,$ and $J_{14-N}$. In the first MCS table, MCS indexes $J_1, J_2, \ldots,$ and $J_{14-N}$ correspond to TBS indexes $J_1, J_2, \ldots,$ and $J_{14-N}$ sequentially, MCS indexes $I_1, I_2, \ldots,$ and $I_N$ correspond to N TBS indexes that are greater than 13, and MCS indexes 14 and 15 correspond to two TBS indexes that are greater than 13.

In MCS-TBS corresponding manner two, in the first MCS table, TBS indexes correspond to MCS indexes 0 to 15 sequentially from small to large.

In this embodiment, in the first MCS table, the number of MCSs corresponding to the 16QAM modulation scheme is K, and the number of MCSs corresponding to the QPSK modulation scheme is L, where K is greater than or equal to L.

In this embodiment, in the first MCS table, the maximum TBS index is TBS 21 or TBS 22, and the corresponding modulation scheme is 16QAM.

In this embodiment, for the in-band mode, based on the first MCS table, MCSs corresponding to TBS indexes less than or equal to 16 may be used for configuring data, and MCSs corresponding to TBS indexes greater than 16 are not used for configuring data.

In this embodiment, the modulation order of QPSK is 2, and the modulation order of 16QAM is 4.

Optionally, there is the first MCS table example one: the N is equal to 6, 6 continuous TBS indexes among TBS indexes 0 to 13 are removed, where the 6 continuous TBS indexes are TBS indexes 1 to 6, and 8 TBS indexes are added, where the 8 TBS indexes are TBS indexes 14 to 21; the TBS indexes in the first MCS table correspond to MCS indexes 0 to 15 sequentially from small to large. In the first MCS table example one, MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 10; or MCSs corresponding to TBS indexes less than or equal to TBS index 11 correspond to the QPSK modulation, and MCSs corresponding to TBS indexes greater than or equal to TBS index 11 correspond to the 16QAM modulation.

TABLE 10

| MCS Index | Modulation order | TBS Index |
|---|---|---|
| 0 | 2 | 0 |
| 1 | 2 | 7 |
| 2 | 2 | 8 |
| 3 | 2 | 9 |
| 4 | 4 | 10 |
| 5 | 4 | 11 |
| 6 | 4 | 12 |
| 7 | 4 | 13 |
| 8 | 4 | 14 |
| 9 | 4 | 15 |
| 10 | 4 | 16 |
| 11 | 4 | 17 |
| 12 | 4 | 18 |
| 13 | 4 | 19 |
| 14 | 4 | 20 |
| 15 | 4 | 21 |

Optionally, there is the first MCS table example two: the N is equal to 7, 7 continuous TBS indexes among TBS indexes 0 to 13 are removed, where the 7 continuous TBS indexes are TBS indexes 1 to 7, and 8 TBS indexes are added, where the 8 TBS indexes are TBS indexes 14 to 22; the TBS indexes in the first MCS table correspond to MCS indexes 0 to 15 sequentially from small to large. In the first MCS table example two, MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 11(A); or MCSs corresponding to TBS indexes less than or equal to TBS index 11 correspond to the QPSK modulation, and MCSs corresponding to TBS indexes greater than or equal to TBS index 11 correspond to the 16QAM modulation.

TABLE 11(A)

| MCS Index | Modulation order | TBS Index |
|---|---|---|
| 0 | 2 | 0 |
| 1 | 2 | 8 |
| 2 | 2 | 9 |
| 3 | 4 | 10 |
| 4 | 4 | 11 |
| 5 | 4 | 12 |
| 6 | 4 | 13 |
| 7 | 4 | 14 |
| 8 | 4 | 15 |
| 9 | 4 | 16 |
| 10 | 4 | 17 |
| 11 | 4 | 18 |
| 12 | 4 | 19 |
| 13 | 4 | 20 |
| 14 | 4 | 21 |
| 15 | 4 | 22 |

Optionally, there is a first MCS table example three: the first MCS table all correspond to the 16QAM modulation scheme, and the specific application examples are shown in Tables 11 (B to E).

TABLE 11 (B)

| MCS Index | Modulation order | TBS Index |
|---|---|---|
| 0 | 4 | 9 |
| 1 | 4 | 10 |
| 2 | 4 | 11 |
| 3 | 4 | 12 |
| 4 | 4 | 13 |
| 5 | 4 | 14 |
| 6 | 4 | 15 |
| 7 | 4 | 16 |
| 8 | 4 | 17 |
| 9 | 4 | 18 |
| 10 | 4 | 19 |
| 11 | 4 | 20 |
| 12 | 4 | 21 |
| 13 | 4 | 22 |
| 14 | — | — |
| 15 | — | — |

TABLE 11 (C)

| MCS Index | Modulation order | TBS Index |
|---|---|---|
| 0 | 4 | 10 |
| 1 | 4 | 11 |
| 2 | 4 | 12 |
| 3 | 4 | 13 |
| 4 | 4 | 14 |
| 5 | 4 | 15 |
| 6 | 4 | 16 |

TABLE 11 (C)-continued

| MCS Index | Modulation order | TBS Index |
|---|---|---|
| 7 | 4 | 17 |
| 8 | 4 | 18 |
| 9 | 4 | 19 |
| 10 | 4 | 20 |
| 11 | 4 | 21 |
| 12 | 4 | 22 |
| 13 | — | — |
| 14 | — | — |
| 15 | — | — |

TABLE 11 (D)

| MCS Index | Modulation order | TBS Index |
|---|---|---|
| 0 | 4 | 9 |
| 1 | 4 | 10 |
| 2 | 4 | 11 |
| 3 | 4 | 12 |
| 4 | 4 | 13 |
| 5 | 4 | 14 |
| 6 | 4 | 15 |
| 7 | 4 | 16 |
| 8 | 4 | 17 |
| 9 | 4 | 18 |
| 10 | 4 | 19 |
| 11 | 4 | 20 |
| 12 | 4 | 21 |
| 13 | — | — |
| 14 | — | — |
| 15 | — | — |

TABLE (E)

| MCS Index | Modulation order | TBS Index |
|---|---|---|
| 0 | 4 | 10 |
| 1 | 4 | 11 |
| 2 | 4 | 12 |
| 3 | 4 | 13 |
| 4 | 4 | 14 |
| 5 | 4 | 15 |
| 6 | 4 | 16 |
| 7 | 4 | 17 |
| 8 | 4 | 18 |
| 9 | 4 | 19 |
| 10 | 4 | 20 |
| 11 | 4 | 21 |
| 12 | — | — |
| 13 | — | — |
| 14 | — | — |
| 15 | — | — |

Optionally, there is the first MCS table example four: the N is equal to 2, 2 continuous TB S indexes among TBS indexes 0 to 13 are removed, where the 2 continuous TBS indexes are TBS indexes 1 and 2, and 4 TBS indexes are added, where the 4 TBS indexes are TBS indexes 15, 17, 19 and 21; the TBS indexes in the first MCS table correspond to MCS indexes 0 to 15 sequentially from small to large.

In the first MCS table example four, MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 12; or MCSs corresponding to TBS indexes less than or equal to TBS index 11 correspond to the QPSK modulation, and MCSs corresponding to TBS indexes greater than or equal to TBS index 11 correspond to the 16QAM modulation.

TABLE 12

| MCS Index | Modulation order | TBS Index |
|---|---|---|
| 0 | 2 | 0 |
| 1 | 2 | 3 |
| 2 | 2 | 4 |
| 3 | 2 | 5 |
| 4 | 2 | 6 |
| 5 | 2 | 7 |
| 6 | 2 | 8 |
| 7 | 2 | 9 |
| 8 | 4 | 10 |
| 9 | 4 | 11 |
| 10 | 4 | 12 |
| 11 | 4 | 13 |
| 12 | 4 | 15 |
| 13 | 4 | 17 |
| 14 | 4 | 19 |
| 15 | 4 | 21 |

Optionally, there is the first MCS table example five: the N is equal to 3, 3 continuous TBS indexes among TBS indexes 0 to 13 are removed, where the 3 continuous TBS indexes are TBS indexes 1 to 3, and 5 TBS indexes are added, where the 5 TBS indexes are TBS indexes 14, 16, 18, 20 and 22; the TBS indexes in the first MCS table correspond to MCS indexes 0 to 15 sequentially from small to large.

In the first MCS table example five, MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 13; or MCSs corresponding to TBS indexes less than or equal to TBS index 11 correspond to the QPSK modulation, and MCSs corresponding to TBS indexes greater than or equal to TBS index 11 correspond to the 16QAM modulation.

TABLE 13

| MCS Index | Modulation order | TBS Index |
|---|---|---|
| 0 | 2 | 0 |
| 1 | 2 | 4 |
| 2 | 2 | 5 |
| 3 | 2 | 6 |
| 4 | 2 | 7 |
| 5 | 2 | 8 |
| 6 | 2 | 9 |
| 7 | 4 | 10 |
| 8 | 4 | 11 |
| 9 | 4 | 12 |
| 10 | 4 | 13 |
| 11 | 4 | 15 |
| 12 | 4 | 17 |
| 13 | 4 | 19 |
| 14 | 4 | 21 |
| 15 | 4 | 22 |

In an application embodiment, the present application provides an MCS table used for the in-band deployment mode in NB-IoT.

In this embodiment, the maximum TBS index included in the MCS table is Table index 15 or TBS index 16.

Optionally, in this embodiment, if the MCS table supports TBS 15 at most, the MCS indexes 0 to 15 correspond to TBS indexes 0 to 15 sequentially. MCSs corresponding to TBS indexes less than or equal to TBS index 9 correspond to the QPSK modulation, and MCSs corresponding to TBS indexes greater than or equal to TBS index 9 correspond to the 16QAM modulation, as shown in Table 14; or MCSs corresponding to TBS indexes less than or equal to TBS index 10 correspond to the QPSK modulation, and MCSs corresponding to TBS indexes greater than or equal to TBS index 10 correspond to the 16QAM modulation.

TABLE 14

| MCS Index | Modulation order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 4 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |

Optionally, in this embodiment, if the MCS table supports TBS 16 at most, the MCS indexes 0 to 15 correspond to 15 TBS indexes in TBS indexes 0 to 16, and the 15 TBS indexes include TBS index 16. For example, the MCS table includes TBS indexes 0, 2 and 16, as shown in Table 15. Optionally, the corresponding manner of the modulation scheme in Table 15 may also be that MCSs corresponding to TBS indexes less than or equal to TBS index 10 correspond to the QPSK modulation, and MCSs corresponding to TBS indexes greater than or equal to TBS index 10 correspond to the 16QAM modulation.

TABLE 15

| MCS Index | Modulation order | TBS Index |
|---|---|---|
| 0 | 2 | 0 |
| 1 | 2 | 2 |
| 2 | 2 | 3 |
| 3 | 2 | 4 |
| 4 | 2 | 5 |
| 5 | 2 | 6 |
| 6 | 2 | 7 |
| 7 | 2 | 8 |
| 8 | 4 | 9 |
| 9 | 4 | 10 |
| 10 | 4 | 11 |
| 11 | 4 | 12 |
| 12 | 4 | 13 |
| 13 | 4 | 14 |
| 14 | 4 | 15 |
| 15 | 4 | 16 |

MCSs corresponding to TBS indexes less than or equal to TBS index 10 correspond to the QPSK modulation, and MCSs corresponding to TBS indexes greater than or equal to TBS index 10 correspond to the 16QAM modulation, as shown in Table 14; or MCSs corresponding to TBS indexes less than or equal to TBS index 11 correspond to the QPSK modulation, and MCSs corresponding to TBS indexes greater than or equal to TBS index 11 correspond to the 16QAM modulation.

Embodiment Six

An MCS table is provided for NB-IoT uplink transmission.

In this embodiment, the maximum TBS index supported by uplink 16QAM modulation is TBS index 13. In the MCS table, MCSs 0 to 10 correspond to TBS indexes 0 to 10, respectively, and the modulation scheme is QPSK; and MCSs 11 to 15 correspond to TBS indexes 9 to 13, respectively, and the modulation scheme is 16QAM, as shown in Table 16.

TABLE 16

| MCS Index | Modulation order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 9 |
| 12 | 4 | 10 |
| 13 | 4 | 11 |
| 14 | 4 | 12 |
| 15 | 4 | 13 |

In an application embodiment, the present application provides an MCS table indicating method. The method includes the following.

When data transmission supports the 16QAM modulation, if the number of repetitions of the physical shared channel is less than or equal to a threshold, an MCS of data is configured based on a first MCS table; and if the number of repetitions of the physical shared channel is greater than the threshold, the MCS of the data is configured based on a second MCS table.

In this embodiment, the highest modulation scheme of the first MCS table is 16QAM.

In this embodiment, the second MCS table is an MCS table defined in the standard protocol of Release 16 (the latest version available). In NB-IoT, the second MCS table does not have a concrete table but satisfies the following correspondence: MCS indexes 0 to 13 correspond to TBS indexes 0 to 13, respectively, the modulation scheme is QPSK, and the indexes are serial numbers.

In this embodiment, whether the data transmission supports 16QAM modulation is determined according to the higher-layer configuration parameter P. When the data transmission supports 16QAM, if the number of repetitions of the physical shared channel is less than or equal to a threshold, the MCS of the data is configured based on a first MCS table, where the highest modulation scheme of the first MCS table is 16QAM; and if the number of repetitions of the physical shared channel is greater than the threshold, the MCS of the data is configured based on a second MCS table, where the highest modulation scheme of the second MCS table is QPSK. The physical shared channel is a PDSCH or a PUSCH.

In this embodiment, the threshold is a fixed number of repetitions.

In NB-IoT, the repetition number field includes contains 4 bits of information and has 16 values for indication for 16 numbers of repetitions. The correspondence between the values of the repetition number fields and numbers of the repetitions is shown in Table 17. Assuming that the threshold is 8, when the number of repetitions of the physical shared channel is 1, 2, 4 and 8, data is configured based on the first MCS table; and when the number of repetitions of the physical shared channel is greater than or equal to 16, data is configured based on the second MCS table.

TABLE 17

| Values of the repetition number field | Number of repetitions |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

In an application embodiment, the present application further provides an MCS table indicating method. The method includes the following.

When the data transmission supports 16 QAM modulation, the repetition number field and the MCS table in downlink control information are used. The repetition number field includes 16 values, where J values correspond to a first MCS table, remaining 16-J values correspond to a second MCS table, and J is greater than or equal to 1.

In this embodiment, the highest modulation scheme of the first MCS table is 16QAM.

In this embodiment, the second MCS table is an MCS table defined in the standard protocol of Release 16. In NB-IoT, the second MCS table does not have a concrete table but satisfies the following correspondence: MCS indexes 0 to 13 correspond to TBS indexes 0 to 13, respectively, the modulation scheme is QPSK, and the indexes are serial numbers.

In this embodiment, whether the data transmission supports 16QAM modulation is determined according to the higher-layer configuration parameter P. When data transmission supports 16QAM, the selection of the number of repetitions of the physical shared channel and the selection of the MCS table are jointly indicated by the repetition number field. The repetition number field includes 4 bits of information and has 16 values, and each value corresponds to one repetition number and one MCS table, where J values correspond to a first MCS table, and the remaining 16-J values correspond to a second MCS table. The physical shared channel is a PDSCH or a PUSCH.

In a specific example of this embodiment, the maximum four values of the repetition number field correspond to the first MCS table and support the 16QAM modulation, and numbers of the repetitions corresponding to the four values are 1, 2, 4 and 8, respectively; and the remaining 12 values correspond to the second MCS table and do not support the 16QAM modulation, as shown in Table 18. The MCS table index 0 is the second MCS table, and the MCS table index 1 is the first MCS table.

TABLE 18

| Values of the repetition number field | Number of repetitions | MCS table index |
|---|---|---|
| 0 | 1 | 0 |
| 1 | 2 | 0 |
| 2 | 4 | 0 |
| 3 | 8 | 0 |
| 4 | 16 | 0 |
| 5 | 32 | 0 |
| 6 | 64 | 0 |
| 7 | 128 | 0 |
| 8 | 192 | 0 |
| 9 | 256 | 0 |
| 10 | 384 | 0 |
| 11 | 512 | 0 |
| 12 | 1 | 1 |
| 13 | 2 | 1 |
| 14 | 4 | 1 |
| 15 | 8 | 1 |

In another specific example of this embodiment, two values of the repetition number field correspond to the first MCS table, and the numbers of repetitions corresponding to the two values are 1 and 2, respectively; and the remaining 14 values correspond to the second MCS table, as shown in Table 19. The MCS table index 0 is the second MCS table, and the MCS table index 1 is the first MCS table. In Table 19, the order between rows may be interchanged, for example, as shown in Tables 20 and 21.

TABLE 19

| Values of the repetition number field | Number of repetition | MCS table index |
|---|---|---|
| 0 | 1 | 0 |
| 1 | 2 | 0 |
| 2 | 4 | 0 |
| 3 | 8 | 0 |
| 4 | 16 | 0 |
| 5 | 32 | 0 |
| 6 | 64 | 0 |
| 7 | 128 | 0 |
| 8 | 192 | 0 |
| 9 | 256 | 0 |
| 10 | 384 | 0 |
| 11 | 512 | 0 |
| 12 | 768 | 0 |
| 13 | 1024 | 0 |
| 14 | 1 | 1 |
| 15 | 2 | 1 |

TABLE 20

| Values of the repetition number field | Number of repetition | MCS table index |
|---|---|---|
| 0 | 1 | 0 |
| 1 | 1 | 1 |
| 2 | 2 | 0 |
| 3 | 2 | 1 |
| 4 | 4 | 0 |
| 5 | 8 | 0 |
| 6 | 16 | 0 |
| 7 | 32 | 0 |
| 8 | 64 | 0 |
| 9 | 128 | 0 |
| 10 | 192 | 0 |
| 11 | 256 | 0 |
| 12 | 384 | 0 |
| 13 | 512 | 0 |
| 14 | 768 | 0 |
| 15 | 1024 | 0 |

TABLE 21

| Values of the repetition number field | Number of repetition | MCS table index |
|---|---|---|
| 0 | 1 | 1 |
| 1 | 2 | 1 |
| 2 | 1 | 0 |
| 3 | 2 | 0 |
| 4 | 4 | 0 |
| 5 | 8 | 0 |
| 6 | 16 | 0 |
| 7 | 32 | 0 |
| 8 | 64 | 0 |
| 9 | 128 | 0 |
| 10 | 192 | 0 |
| 11 | 256 | 0 |
| 12 | 384 | 0 |
| 13 | 512 | 0 |
| 14 | 768 | 0 |
| 15 | 1024 | 0 |

It is to be noted that in the application embodiments described above, the first MCS table and the second MCS table are only for illustrative purposes and are not intended to limit the scope of the present application.

Figure 4:
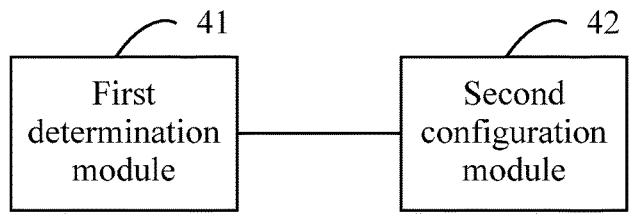
FIG. 4 is a structural diagram of a configuration apparatus according to an embodiment of the present application.

The present application provides a configuration apparatus. FIG. 4 is a structural diagram of a configuration apparatus according to an embodiment of the present application. The apparatus may be applied to the case of determining the MCS of data based on the modulation scheme. The configuration apparatus may be implemented by software and/or hardware and is configured in a first communication node.

As shown in FIG. 4, the configuration apparatus provided by this embodiment of the present application mainly includes a first determination module 41 and a second configuration module 42.

The first determination module 41 is configured to determine an MCS set based on a higher-layer configuration parameter, where the higher-layer configuration parameter indicates whether data transmission supports a 16QAM modulation scheme, and the MCS set includes one or more of: a first MCS set or a second MCS set.

The first configuration module 42 is configured to configure an MCS of data based on the MCS set.

In an example embodiment, the first determination module 41 is configured to, in a case where the data transmission supports the 16QAM modulation scheme, determine the MCS set to be the first MCS set or the second MCS set; and in a case where the data transmission does not support the 16QAM modulation scheme, determine the MCS set to be the second MCS set.

In an example embodiment, the first determination module 41 is specifically configured to, in a case where the data transmission supports the 16QAM modulation scheme and the number of repetitions of a physical shared channel is less than or equal to a preset threshold, determine the MCS set to be the first MCS set; and in a case where the data transmission supports the 16QAM modulation scheme and the number of repetitions of the physical shared channel is greater than the preset threshold, determine the MCS set to be the second MCS set.

In an example embodiment, the first determination module 41 is configured to indicate the number of repetitions and the MCS table using a repetition number field in downlink control information. Further, the repetition number field includes H values, where J values indicate the first MCS table, the remaining H-J values indicate the second MCS table, J is an integer greater than or equal to 1, and H is an integer greater than or equal to 1.

In an example embodiment, the first MCS set and the second MCS set may satisfy the following relationship: for the second MCS set, TBS indexes of the first MCS set are obtained by removing N TBS indexes from the second MCS set and adding N+2 TBS indexes to the second MCS set, where the removed TBS indexes are less than or equal to TBS 13, the added TBS indexes are greater than TBS 13, and N is an integer greater than or equal to 0; or based on the second MCS set, the TBS indexes of the first MCS table are obtained by reserving M TBS indexes of the second MCS set and adding T TBS indexes to the second MCS set, where the reserved TBS indexes are less than or equal to TBS 13, the added TBS indexes are greater than TBS 13, T+M=16, and both T and M are integers greater than or equal to 0.

In an example embodiment, the operation of removing N TBS indexes includes one of the following operations.

N odd TBS indexes are removed.

N even TBS indexes are removed.

N continuous TBS indexes are removed.

In an example embodiment, in the first MCS set, the number of MCSs corresponding to the 16QAM modulation scheme is K, and the number of MCSs corresponding to the QPSK modulation scheme is L, where K is greater than or equal to L, and both K and L are integers greater than or equal to 0.

In an example embodiment, in the first MCS set, the maximum TBS index is TBS 21 or TBS 22.

In an example embodiment, for an in-band deployment mode, in a case where the MCS set is the first MCS set, a configurable TBS index is less than or equal to TBS 16.

In an example embodiment, for the in-band deployment mode, the first MCS set includes 16 MCSs, where the 16 MCSs correspond to TBS indexes TBS 0 to TBS 15.

In an example embodiment, for the in-band deployment mode, the first MCS set includes 16 MCSs, where the 16 MCSs correspond to 15 TBS indexes in TBS indexes TBS 0 to TBS 16, and the 15 TBS indexes include TBS 16.

In an example embodiment, for uplink transmission, in the first MCS set, MCS indexes MCS 0 to MCS 10 correspond to TBS indexes TBS 0 to TBS 10, respectively, and a modulation scheme corresponding to the MCS indexes MCS 0 to MCS 10 is the QPSK modulation scheme; and MCS indexes MCS 11 to MCS 15 correspond to TBS indexes TBS 9 to TBS 13, respectively, and a modulation scheme corresponding to the MCS indexes MCS 11 to MCS 15 is the 16QAM modulation scheme.

The configuration apparatus provided by this embodiment may execute the configuration method provided by any of the embodiments of the present disclosure and has functional modules and beneficial effects corresponding to the executed method. For technical details that are not described in detail in this embodiment, reference may be made to the configuration method provided by any of the embodiments of the present disclosure.

It is to be noted that units and modules involved in the embodiments of the configuration apparatus are just divided according to functional logic, and the division is not limited to this, as long as the corresponding functions can be implemented. In addition, the names of functional units are just intended to distinguish and not to limit the scope of the present application.

Figure 5:
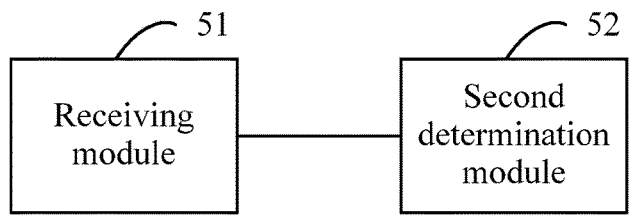
FIG. 5 is a structural diagram of a receiving apparatus according to an embodiment of the present application.

The present application provides a configuration apparatus. FIG. 5 is a structural diagram of a receiving apparatus according to an embodiment of the present application. The apparatus may be applied to the case of determining the MCS of data based on the modulation scheme. The configuration apparatus may be implemented by software and/or hardware and is configured in a second communication node.

As shown in FIG. 5, the configuration apparatus provided by this embodiment of the present application mainly includes a receiving module 51 and a second determination module 52.

The receiving module 51 is configured to receive a higher-layer configuration parameter.

The second determination module 52 is configured to determine an MCS set based on the higher-layer configuration parameter; where the higher-layer configuration parameter indicates whether data transmission supports a 16QAM modulation scheme, and the MCS set includes one or more of: a first MCS set or a second MCS set.

In an example embodiment, the second determination module 52 is configured to, in a case where the data transmission supports the 16QAM modulation scheme, determine the MCS set according to a repetition number field in downlink control information.

In an example embodiment, the second determination module 52 is configured to, in a case where the data transmission supports the 16QAM modulation scheme and the number of repetitions of a physical shared channel indicated by the repetition number field is less than or equal to a preset threshold, determine the MCS set to be the first MCS set; and in a case where the data transmission supports the 16QAM modulation scheme and the number of repetitions of the physical shared channel indicated by the repetition number field is greater than the preset threshold, determine the MCS set to be the second MCS set.

Further, in a case where the data transmission does not support the 16QAM modulation scheme, the MCS set is the second MCS set.

In an example embodiment, the second determination module 52 is configured to, in a case where the data transmission supports the 16QAM modulation scheme and the value of the repetition number field corresponds to the first MCS set, determine the MCS set to be the first MCS set; and in a case where the data transmission supports the 16QAM modulation scheme and the value of the repetition number field corresponds to the second MCS set, determine the MCS set to be the second MCS set.

Further, the repetition number field includes H values, where J values indicate the first MCS table, the remaining H-J values indicate the second MCS table, J is an integer greater than or equal to 1, and H is an integer greater than or equal to 1.

In an example embodiment, the first MCS set and the second MCS set may satisfy the following relationship: for the second MCS set, TBS indexes of the first MCS set are obtained by removing N TBS indexes from the second MCS set and adding N+2 TBS indexes to the second MCS set, where the removed TBS indexes are less than or equal to TBS 13, the added TBS indexes are greater than TBS 13, and N is an integer greater than or equal to 0; or based on the second MCS set, the TBS indexes of the first MCS table are obtained by reserving M TBS indexes of the second MCS set and adding T TBS indexes to the second MCS set, where the reserved TBS indexes are less than or equal to TBS 13, the added TBS indexes are greater than TBS 13, T+M=16, and both T and M are integers greater than or equal to 0.

In an example embodiment, the operation of removing N TBS indexes includes one of the following operations.

N odd TBS indexes are removed.

N even TBS indexes are removed.

N continuous TBS indexes are removed.

In an example embodiment, in the first MCS set, the number of MCSs corresponding to the 16QAM modulation scheme is K, and the number of MCSs corresponding to the QPSK modulation scheme is L, where K is greater than or equal to L, and both K and L are integers greater than or equal to 0.

In an example embodiment, in the first MCS set, the maximum TBS index is TBS 21 or TBS 22.

In an example embodiment, for an in-band deployment mode, in a case where the MCS set is the first MCS set, a configurable TBS index is less than or equal to TBS 16.

In an example embodiment, for the in-band deployment mode, the first MCS set includes 16 MCSs, where the 16 MCSs correspond to TBS indexes TBS 0 to TBS 15.

In an example embodiment, for the in-band deployment mode, the first MCS set includes 16 MCSs, where the 16 MCSs correspond to 15 TBS indexes in TBS indexes TBS 0 to TBS 16, and the 15 TBS indexes include TBS 16.

In an example embodiment, for uplink transmission, in the first MCS set, MCS indexes MCS 0 to MCS 10 correspond to TBS indexes TBS 0 to TBS 10, respectively, and a modulation scheme corresponding to the MCS indexes MCS 0 to MCS 10 is the QPSK modulation scheme; and MCS indexes MCS 11 to MCS 15 correspond to TBS indexes TBS 9 to TBS 13, respectively, and a modulation scheme corresponding to the MCS indexes MCS 11 to MCS 15 is the 16QAM modulation scheme.

The receiving apparatus provided by this embodiment may execute the receiving method provided by any of the embodiments of the present disclosure and has functional modules and beneficial effects corresponding to the executed method. For technical details that are not described in detail in this embodiment, reference may be made to the configuration method provided by any of the embodiments of the present disclosure.

It is to be noted that units and modules involved in the embodiments of the receiving apparatus are just divided according to functional logic, and the division is not limited to this, as long as the corresponding functions can be implemented. In addition, the names of functional units are just intended to distinguish and not to limit the scope of the present application.

Figure 6:
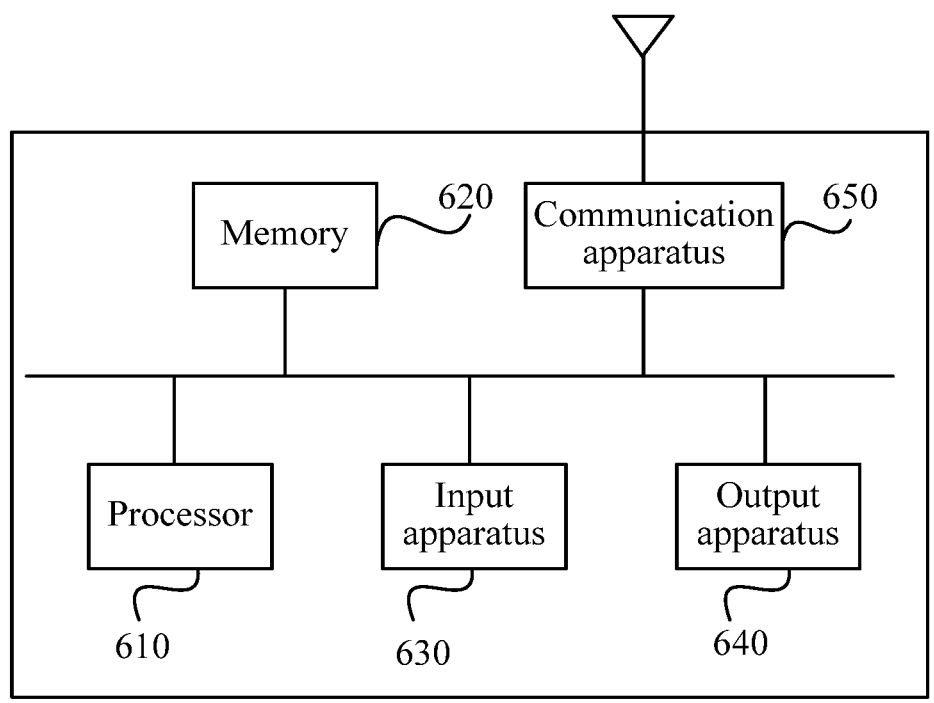
FIG. 6 is a structural diagram of a device according to an embodiment of the present application.

The embodiments of the present application further provide a device. FIG. 16 is a structural diagram of a device according to an embodiment of the present application. As shown in FIG. 6, the device includes a processor 610, a memory 620, an input apparatus 630, an output apparatus 640 and a communication apparatus 650. The number of processors 610 in the device may be one or more, and one processor 610 is illustrated in FIG. 6. The processor 610, the memory 620, the input apparatus 630 and the output apparatus 640 in the device may be connected to each other via a bus or in other ways, and the connection via a bus is illustrated in FIG. 6.

As a computer-readable storage medium, the memory 620 may be configured to store software programs, computer-executable programs and modules, such as program instructions/modules corresponding to the configuration method in the embodiments of the present application (for example, the first determination module 41 and the second configuration module 42 in the configuration apparatus) or program instructions/modules corresponding to the receiving method in the embodiments of the present application (for example, the receiving module 51 and the second determination module 52 in the receiving apparatus). The processor 610 runs the software programs, instructions and modules stored in the memory 620 to perform function applications and data processing of the device, that is, to implement any of the methods provided by the embodiments of the present application.

Furthermore, the memory 620 may mainly include a program storage region and a data storage region, where the program storage region may store an operating system and an application program required by at least one function while the data storage region may store data created depending on use of the device. Furthermore, the memory 620 may include a high-speed random-access memory, and may also include a non-volatile memory such as at least one disk memory, flash memory or other non-volatile solid-state memories. In some examples, the memory 620 may further include memories which are remotely disposed relative to the processor 610, and these remote memories may be connected to the device via a network. Examples of the preceding network include, but are not limited to, the Internet, an intranet, a local area network, a mobile communication network, and a combination thereof.

The input apparatus 630 may be used for receiving inputted digital or character information and for generating soft key signal input related to user settings and function control of the device. The output apparatus 640 may include display devices such as a display screen.

The communication apparatus 650 may include a receiver and a transmitter. The communication apparatus 650 is configured to perform information transceiving communication according to the control of the processor 610.

It is to be noted that in a case where the device is the first communication node, the processor 610 executes programs stored in the system memory 620 to perform a variety of function applications and data processing, for example, to perform the configuration method provided by the embodiments of the present application. The method includes the following operations.

An MCS set is determined based on a higher-layer configuration parameter.

An MCS of data is configured based on the MCS set.

The higher-layer configuration parameter indicates whether data transmission supports a 16QAM modulation scheme, and the MCS set includes one or more of: a first MCS set or a second MCS set.

Of course, it is to be understood by those skilled in that art that the processor 610 may also perform the technical solutions of the encoding method provided by any of the embodiments of the present application.

It is to be noted that in a case where the device is the second communication node, the processor 610 executes programs stored in the system memory 620 to perform a variety of function applications and data processing, for example, to perform the receiving method provided by the embodiments of the present application. The method includes the following operations.

A higher-layer configuration parameter is received.

An MCS set is determined based on the higher-layer configuration parameter.

The higher-layer configuration parameter indicates whether data transmission supports a 16QAM modulation scheme, and the MCS set includes one or more of: a first MCS set or a second MCS set.

Of course, it is to be understood by those skilled in that art that the processor 610 may also perform the technical solutions of the modulation encoding method provided by any of the embodiments of the present application.

The embodiments of the present application further provide a storage medium including computer-executable instructions, where the computer-executable instructions are used for, when executed by a computer processor, performing a configuration method. The method includes the following operations.

An MCS set is determined based on a higher-layer configuration parameter.

An MCS of data is configured based on the MCS set.

The higher-layer configuration parameter indicates whether data transmission supports a 16QAM modulation scheme, and the MCS set includes one or more of: a first MCS set or a second MCS set.

Of course, in the storage medium including computer-executable instructions provided by the embodiments of the present application, the computer-executable instructions implement not only the method operations described above but also related operations in the configuration method provided by the embodiments of the present application.

The embodiments of the present application further provide a storage medium including computer-executable instructions, where the computer-executable instructions are used for, when executed by a computer processor, performing a receiving method. The method includes the following operations.

A higher-layer configuration parameter is received.

An MCS set is determined based on the higher-layer configuration parameter.

The higher-layer configuration parameter indicates whether data transmission supports a 16QAM modulation scheme, and the MCS set includes one or more of: a first MCS set or a second MCS set.

Of course, in the storage medium including computer-executable instructions provided by the embodiments of the present application, the computer-executable instructions implement not only the method operations described above but also related operations in the receiving method provided by the embodiments of the present application.

From the preceding description of embodiments, it is to be understood by those skilled in the art that the present application may be implemented by software and general-purpose hardware or may be implemented by hardware. The technical solutions of the present application may essentially be embodied in the form of a software product. The software product in a computer may be stored in a computer-readable storage medium such as a floppy disk, read-only memory (ROM), random-access memory (RAM), flash memory, hard disk or optical disc in the computer and includes multiple instructions for enabling a computer device (which may be a personal computer, a server or a network device) to execute the methods of the embodiments of the present application.

The preceding are only example embodiments of the present application and are not intended to limit the scope of the present application.

It is to be understood by those skilled in the art that the term user terminal encompasses any suitable type of wireless user device, such as a mobile phone, a portable data processing apparatus, a portable web browser or an onboard mobile station.

In general, multiple embodiments of the present application may be implemented in hardware, a special-purpose circuit, software, logic, or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. The data processor may be of any type suitable to the local technical environment such as, but not limited to, a general-purpose computer, a special-purpose computer, a microprocessor, a digital signal processor (DSP), an application-specific integrated circuit (ASIC), a field—programmable gate array (FPGA) and a processor based on a multi-core processor architecture.

A detailed description of exemplary embodiments of the present application has been provided in the preceding through exemplary and non-restrictive examples. However, considering the drawings and the claims, various modifications and adjustments to the preceding embodiments are obvious to those skilled in the art but do not deviate from the scope of the present application. Accordingly, the proper scope of the present disclosure is determined according to the claims.

What is claimed is:

1. A configuration method, comprising:
   configuring a higher-layer configuration parameter; and
   sending the higher-layer configuration parameter;
   wherein the higher-layer configuration parameter indicates whether data transmission supports a 16 quadrature amplitude modulation (16QAM) modulation scheme,
   wherein a modulation and coding scheme (MCS) set is based on the higher-layer configuration parameter, the MCS set comprises at least one of: a first MCS set or a second MCS set, and
   wherein the first MCS set only comprises MCSs for the 16QAM modulation scheme, and the second MCS set only comprises MCSs for a quadrature phase-shift keying (QPSK) modulation scheme.

2. A receiving method, comprising:
   receiving a higher-layer configuration parameter; and
   determining a modulation and coding scheme (MCS) set based on the higher-layer configuration parameter;
   wherein the higher-layer configuration parameter indicates whether data transmission supports a 16 quadrature amplitude modulation (16QAM) modulation scheme, and the MCS set comprises at least one of: a first MCS set or a second MCS set,
   wherein the first MCS set only comprises MCSs for the 16QAM modulation scheme, and the second MCS set only comprises MCSs for a quadrature phase-shift keying (QPSK) modulation scheme.

3. The method of claim 2, wherein determining the MCS set based on the higher-layer configuration parameter comprises:
   in response to determining that the higher-layer configuration parameter indicates that the data transmission supports the 16QAM modulation scheme, determining the MCS set to be the first MCS set or the second MCS set; and
   in response to determining that the higher-layer configuration parameter indicates that the data transmission does not support the 16QAM modulation, determining the MCS set to be the second MCS set.

4. The method of claim 2, wherein a maximum transport block size (TBS) index in the first MCS set is TBS 21.

5. The method of claim 2, wherein the second MCS set satisfies the following correspondence: MCS indexes 0 to 13 correspond to transport block size (TBS) indexes 0 to 13, respectively.

6. The method of claim 2, wherein a first modulation order corresponding to the first MCS set is larger than a second modulation order corresponding to the second MCS set.

7. The method of claim 6, wherein the first modulation order corresponding to the first MCS set is 4, and the second modulation order corresponding to the second MCS set is 2.

8. An apparatus comprising:
   a memory storing a plurality of instructions; and
   a processor configured to execute the plurality of instructions, and upon execution of the plurality of instructions, is configured to:
   configure a higher-layer configuration parameter; and
   send the higher-layer configuration parameter;
   wherein the higher-layer configuration parameter indicates whether data transmission supports a 16 quadrature amplitude modulation (16QAM) modulation scheme,
   wherein a modulation and coding scheme (MCS) is based on the higher-layer configuration parameter, the MCS set comprises at least one of: a first MCS set or a second MCS set, and
   wherein the first MCS set only comprises MCSs for the 16QAM modulation scheme, and the second MCS set only comprises MCSs for a quadrature phase-shift keying (QPSK) modulation scheme.

9. An apparatus comprising:
   a memory storing a plurality of instructions; and
   a processor configured to execute the plurality of instructions, and upon execution of the plurality of instructions, is configured to:
   receive a higher-layer configuration parameter; and
   determine a modulation and coding scheme (MCS) set based on the higher-layer configuration parameter,
   wherein the higher-layer configuration parameter indicates whether data transmission supports a 16 quadrature amplitude modulation (16QAM) modulation scheme, and the MCS set comprises at least one of: a first MCS set or a second MCS set, and
   wherein the first MCS set only comprises MCSs for the 16QAM modulation scheme, and the second MCS set only comprises MCSs for a quadrature phase-shift keying (QPSK) modulation scheme.

10. The apparatus of claim 9, wherein in order to determine the MCS set based on the higher-layer configuration parameter, the processor, upon execution of the plurality of instructions, is configured to:
    in response to a determination that the higher-layer configuration parameter indicates that the data transmission supports the 16QAM modulation scheme, determine the MCS set to be the first MCS set or the second MCS set; and in response to a determination that the higher-layer configuration parameter indicates that the data transmission does not support the 16QAM modulation scheme, determine the MCS set to be the second MCS set.

11. The apparatus of claim 9, wherein a maximum transport block size (TBS) index in the first MCS set is TBS 21.

12. The apparatus of claim 9, wherein the second MCS set satisfies the following correspondence: MCS indexes 0 to 13 correspond to transport block size (TBS) indexes 0 to 13, respectively.

13. The apparatus of claim 9, wherein a first modulation order corresponding to the first MCS set is larger than a second modulation order corresponding to the second MCS set.

14. The apparatus of claim 13, wherein the first modulation order corresponding to the first MCS set is 4, and the second modulation order corresponding to the second MCS set is 2.

* * * * *